United States Patent
Korn et al.

(10) Patent No.: US 11,880,292 B2
(45) Date of Patent: Jan. 23, 2024

(54) ENVIRONMENT SIMULATIONS

(71) Applicant: ENTIT SOFTWARE LLC, Sanford, NC (US)

(72) Inventors: Amitay Korn, Yehud (IL); Avivi Siman-Tov, Yehud (IL); Olga Kogan, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 629 days.

(21) Appl. No.: 16/077,899

(22) PCT Filed: Feb. 17, 2016

(86) PCT No.: PCT/US2016/018260
§ 371 (c)(1),
(2) Date: Aug. 14, 2018

(87) PCT Pub. No.: WO2017/142530
PCT Pub. Date: Aug. 24, 2017

(65) Prior Publication Data
US 2019/0079849 A1   Mar. 14, 2019

(51) Int. Cl.
*G06F 11/34* (2006.01)
*G06Q 50/04* (2012.01)
(Continued)

(52) U.S. Cl.
CPC ........ *G06F 11/3457* (2013.01); *G06F 11/261* (2013.01); *G06F 11/3664* (2013.01);
(Continued)

(58) Field of Classification Search
USPC .......................................................... 703/13
See application file for complete search history.

(56) References Cited

U.S. PATENT DOCUMENTS 5,381,417 A   1/1995 Loopik et al.
6,595,035 B1 * 7/2003 Maley .................. G01N 29/227
                                                         73/64.53
(Continued)

FOREIGN PATENT DOCUMENTS

CN   103633639    *  3/2014   ......... H04L 41/0631
KR   100173214 B1   5/1999
KR   20100080965 A   7/2010

OTHER PUBLICATIONS

Mitchell, Robert et al., "Adaptive Intrusion Detection of Malicious Unmanned Air Vehicles Using Behavior Rule Specifications", IEEE Transactions on Systems, Man, and Cybernetics: Systems, vol. 44 No. 5, May 2014 (Year: 2014).*

(Continued)

*Primary Examiner* — Brian S Cook
(74) *Attorney, Agent, or Firm* — Sheridan Ross P.C.

(57) ABSTRACT

Example implementations relate to simulating an environment. For example, a system for environment simulation may include a simulation engine to build an environment simulation to mimic portions of a real environment relevant to a detected anomaly trend, an acceleration engine to simulate, within the environment simulation, a scenario associated with the detected anomaly at a rate faster than the scenario occurs in the real environment, a abnormal behavior engine to detect a abnormal behavior associated with the scenario, and an adaptation engine to modify a device within the real environment to be adaptive to the scenario, based on the detected abnormal behavior.

20 Claims, 4 Drawing Sheets

(51) Int. Cl.
*G06Q 10/04* (2023.01)
*G06Q 10/067* (2023.01)
*G06F 11/26* (2006.01)
*G06F 11/36* (2006.01)

(52) U.S. Cl.
CPC .......... *G06Q 10/04* (2013.01); *G06Q 10/067* (2013.01); *G06Q 50/04* (2013.01); *Y02P 90/30* (2015.11)

(56) References Cited

U.S. PATENT DOCUMENTS

| | | | | |
|---|---|---|---|---|
| 6,728,658 | B1* | 4/2004 | Bechhoefer | G01H 1/003 702/181 |
| 7,676,445 | B2 | 3/2010 | Fry et al. | |
| 7,725,303 | B2* | 5/2010 | Tramontana | B61L 27/0055 703/13 |
| 8,793,787 | B2* | 7/2014 | Ismael | G06F 21/566 726/22 |
| 9,218,570 | B2* | 12/2015 | Biem | G06F 11/079 |
| 10,997,513 | B1* | 5/2021 | Groth | G06N 7/005 |
| 2004/0181376 | A1 | 9/2004 | Fables | |
| 2005/0187745 | A1* | 8/2005 | Lurie | G16B 25/10 703/11 |
| 2005/0193739 | A1* | 9/2005 | Brunell | G05B 13/042 60/772 |
| 2005/0240382 | A1* | 10/2005 | Nakaya | G05B 19/41885 703/6 |
| 2005/0251276 | A1* | 11/2005 | Shen | G05B 23/024 700/108 |
| 2006/0161416 | A1 | 7/2006 | Tramontana | |
| 2007/0005266 | A1* | 1/2007 | Blevins | H04L 67/289 702/22 |
| 2007/0100478 | A1* | 5/2007 | Egeland | G05B 23/0256 700/45 |
| 2008/0027704 | A1* | 1/2008 | Kephart | G05B 19/41885 703/22 |
| 2008/0155360 | A1* | 6/2008 | Bates | G06F 11/362 714/57 |
| 2010/0192223 | A1 | 7/2010 | Ismael | |
| 2013/0116802 | A1* | 5/2013 | Friman | G05B 17/02 700/30 |
| 2013/0147630 | A1* | 6/2013 | Nakaya | G05D 23/00 340/691.6 |
| 2013/0253897 | A1* | 9/2013 | Kanbe | G05B 19/0426 703/13 |
| 2013/0304439 | A1* | 11/2013 | Van der Velden | G06F 30/20 703/6 |
| 2013/0317629 | A1* | 11/2013 | Shapiro | G05B 13/02 700/31 |
| 2014/0135947 | A1* | 5/2014 | Friman | G05B 13/04 700/29 |
| 2015/0192636 | A1* | 7/2015 | Fries | B61L 29/30 324/511 |
| 2015/0205271 | A1* | 7/2015 | Richter | G05B 17/02 700/29 |
| 2015/0308204 | A1* | 10/2015 | Johnson | E21B 21/08 700/282 |
| 2017/0235622 | A1* | 8/2017 | Boyapalle | G06F 11/3409 714/47.2 |
| 2018/0004180 | A1* | 1/2018 | Kar | G05B 19/0426 |

OTHER PUBLICATIONS

Zhou, Chunjie et al., "Design and Analysis of Multimodel-Based Anomaly Intrusion Detection Systems in Industrial Process Automation", IEEE Transactions on Systems, Man, and Cybernetics: Systems, vol. 45 No. 10, Oct. 2015 (Year: 2015).*
Salmon Nazir et al., "How a plant simulator can improve industrial safety," 2015, Process Safety Progress, vol. 34, No. 3, 7 pages (Year: 2015).*
M. Berutti, "Simulation and design software," 2010, Instrumentation Reference Book, Elsevier Inc., 2 pages (Year: 2010).*
Makoto Nakaya et al., "On-line simulator for plant operation," 2006, Proceedings of the 6th World Congress on Intelligent Control and Automation, 4 pages (Year: 2006).*
"Mirror Plant," 2014, Wayback Machine https://www.omegasim.co.jp/contents_e/solution/mirror/, 8 pages (Year: 2014).*
Jovan D. Boskovic et al., "A multiple model-based reconfigurable flight control system design," 1998, Proceedings of the 37th Conference on Decision and Control, 7 pages (Year: 1998).*
Nakaya Makoto et al., "Utilization of Tracking Simulator and its application to the future plant operation," 2009, Yokogawa Technical Report English Edition No. 47, 4 pages (Year: 2009).*
Kenneth R. Dixon, "Modeling and simulation in ecotoxicology with applications in Matlab and Simulink," 2012, CRC Press, 3 pages ( Year: 2012).*
Piotr Tatjewski, "Advanced Control of Industrial Processes," Chapter 3, Model-based Predictive Control, 2007, Springer, pp. 106-271 (Year: 2007).*
Banerjee, A., et al., Anomaly Detection: A Tutorial, University of Minnesota, 2004, 103 pages.
Bencomo, A., Applications of Condition Monitoring for the Subsea Industry, University of Stavanger, Master's Thesis, Jun. 28, 2012, 89 pages.
International Searching Authority., International Search Report and Written Opinion dated Nov. 16, 2016 for PCT Application No. PCT/US2016/018260 Filed Feb. 17, 2016 14 pages.
Lazic, L., et al., Integrated Intelligent Modeling, Simulation and Design of Experiments for Software Testing Process, Latest Trends on Computer, vol. 2, Jul. 12, 2010, 13 pages.
Sapp, D., Predictive Testing & Inspection (PT&I) Can Prevent Operational Interruptions, WBDG—National Institute of building Sciences, Dec. 15, 2010, 4 pages.

* cited by examiner

ENVIRONMENT SIMULATIONS

BACKGROUND

Monitoring systems may be used to monitor resources and performance in a computer system. For example, monitoring systems may be used to keep track of system resources, such as central processing unit (CPU) usage and frequency and/or the amount of free random-access memory (RAM). They may also be used to display items such as free space on one or more hard drives, the temperature of the CPU, and/or other components, and networking information including a system IP address and/or current rates of upload and download.

DETAILED DESCRIPTION

As the complexity of applications grows, especially in the age of Internet of Things (IoT), verifying that applications are working correctly in particular circumstances and under particular conditions has become increasingly challenging. Variability of data, contexts, conditions of the physical environment, sequences of possible application flows, etc. may be high enough that pre-defining every possible outcome and condition in the lab environment may be difficult. As a result, it may be difficult to respond in a timely manner when the unexpected occurs, thus making it challenging to provide a way to recover from faults or adapt to the new conditions without compromising the system.

Some approaches to monitoring systems include the use of predictive approaches to recognize faults and problems before they start to affect the system. However, if a system is not built to deal with the predicted or early detected problems quickly enough, the prediction may be useless. Other approaches utilize testing techniques that may provide a way to test in production, but those approaches may not be practical because of regulation, costs, or other reasons.

Some examples of the present disclosure may relate to determining root causes of abnormal behavior in simulations environments and fixing and adapting to the abnormal behavior. Examples may include determining potential anomalies in a real environment and accelerating the anomalies in an environment simulation. For instance, a potential anomaly affecting an application may be overcompensated (e.g., be made more severe, be made more frequently occurring, and/or made to happen faster) in the environment simulation to see how the application may react in the real environment. Using what is learned in the environment simulation, the application may be modified, such that it is adaptive to the tested anomaly. The acceleration may allow for modification to the application (or real devices, etc.) before the anomaly happens in a real-world environment. Put another way, examples may combine real-time anomaly detection with testing application behaviors in an environment simulation that includes acceleration and/or overcompensation of the predicted/detected anomalies.

Figure 1:
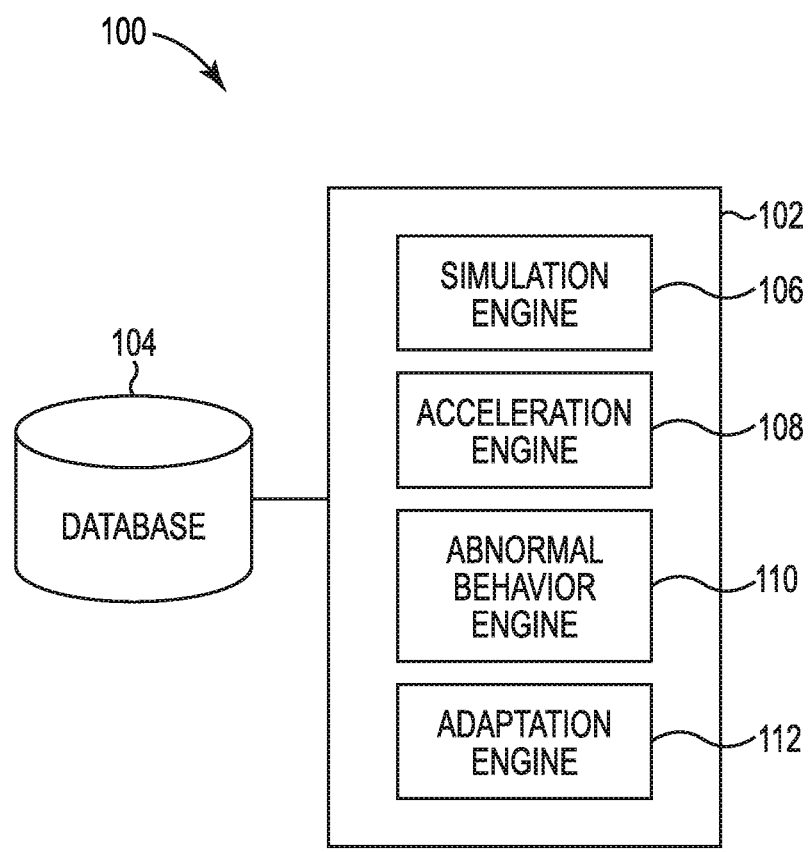
FIG. 1 is a block diagram of an example system for environment simulation consistent with the present disclosure.

FIG. 1 is a block diagram of an example system 100 for environment simulation consistent with the present disclosure. The system 100 may include a database 104, an environment simulation system 102, and/or a number of engines. For instance, the system 100 may include simulation engine 106, an acceleration engine 108, an abnormal behavior engine 110, and an adaptation engine 112. The environment simulation system 102 may be in communication with the database 104 via a communication link, and may include the number of engines. Put another way, the environment simulation system 102 may include simulation engine 106, acceleration engine 108, abnormal behavior engine 110, and adaptation engine 112. The environment simulation system 102 may include additional or fewer engines than illustrated to perform the various operations as will be described in further detail in connection with FIGS. 2-5.

The number of engines may include a combination of hardware and programming, but at least hardware, to perform operations described herein. The number of engines may be stored in a memory resource and/or implemented as a hard-wired program, or "logic". As used herein, "logic" is an alternative or additional processing resource to perform a particular action and/or operation, described herein, which includes hardware, various forms of transistor logic, application specific integrated circuits (ASICs), among others, as opposed to computer executable instructions or instructions stored in memory and executable by a processor.

For example, simulation engine 106, acceleration engine 108, abnormal behavior engine 110, and adaptation engine 112 may include a combination of hardware and programming, but at least hardware, to perform operations related to environment simulation. As used herein, a memory resource may include a computer readable medium, and/or a machine-readable medium, among other examples. Also, as used herein, hard-wired programming may refer to logic.

The simulation engine 106 may include hardware and/or a combination of hardware and programming, but at least hardware, to build an environment simulation to mimic portions of a real environment relevant to a detected anomaly trend. The acceleration engine 108 may include hardware and/or a combination of hardware and programming, but at least hardware, to simulate, within the environment simulation, a scenario associated with the detected anomaly at a rate faster than the scenario occurs in the real environment. In some examples, the acceleration engine may simulate the scenario associated with the detected anomaly at a more severe level than the scenario occurs in the real environment and/or simulate the scenario associated with the detected anomaly at a more frequent occurrence than the scenario occurs in the real environment. For example, by accelerating the scenario, it may happen in the environment simulation before it happens in the real-world environment, allowing for fixes to be made.

The abnormal behavior engine 110 may include hardware and/or a combination of hardware and programming, but at least hardware, to detect an abnormal behavior associated with the scenario. An abnormal behavior may include an anomaly, trend, or problem, among others that may occur within the system, application, etc. Such an abnormal behavior may include or cause undesired impacts/outputs, failures, faults, and unexpected conditions, among others. In some examples, abnormal behavior module 110 may include a controller to execute a root cause analysis of an abnormal behavior that is detected while simulating a scenario in an accelerated way. Such an example may include the controller executing tools of debugging and monitoring to find a root cause of the abnormal behavior.

Further, the adaptation engine 112 may include hardware and/or a combination of hardware and programming, but at least hardware, to modify a device within the real environment to be adaptive to the scenario, based on the detected abnormal behavior. For instance, because the scenario was accelerated, the abnormal behavior may be detected earlier in the environment simulation than in a real-world environment, and a fix may be determined. This fix may be used to modify the device. In some examples, the adaptation engine may also modify the device in response to a predicted anomaly occurring in the real environment using the fix previously determined. In some examples, adaption engine 112 may include a controller to execute modification of code, configuration, etc. and preparing a fix to the abnormal behavior to be released and deployed in a production environment. This may include a plurality of executions including, for instance, development, testing, and release.

Environment simulation system 102 may also include a monitoring engine (not pictured) including hardware and/or a combination of hardware and programming, but at least hardware to detect an anomaly in the real environment based on predictions created using collected monitoring data. For instance, using the collected monitoring data, predictions may be made as to what may happen in the real environment based on previously collected or considered data, previous simulations, and other available information.

Environment simulation system 102 may combine real-time anomaly detection with testing of adaptive behaviors of an application under test by simulating discovered production trends and/or overcompensating those trends (e.g., making them more severe, making them happen faster or more frequently, etc.). For instance, environment simulation system 102 may allow for an end-to-end approach for creating adaptive applications. Adaptive applications may be built that adapt to specific environment changes and become more resilient over time. This may be useful for anomalies/trends/problems/system behaviors that cannot be pre-defined or be known upfront and are specific to certain environments or conditions.

Figure 2:
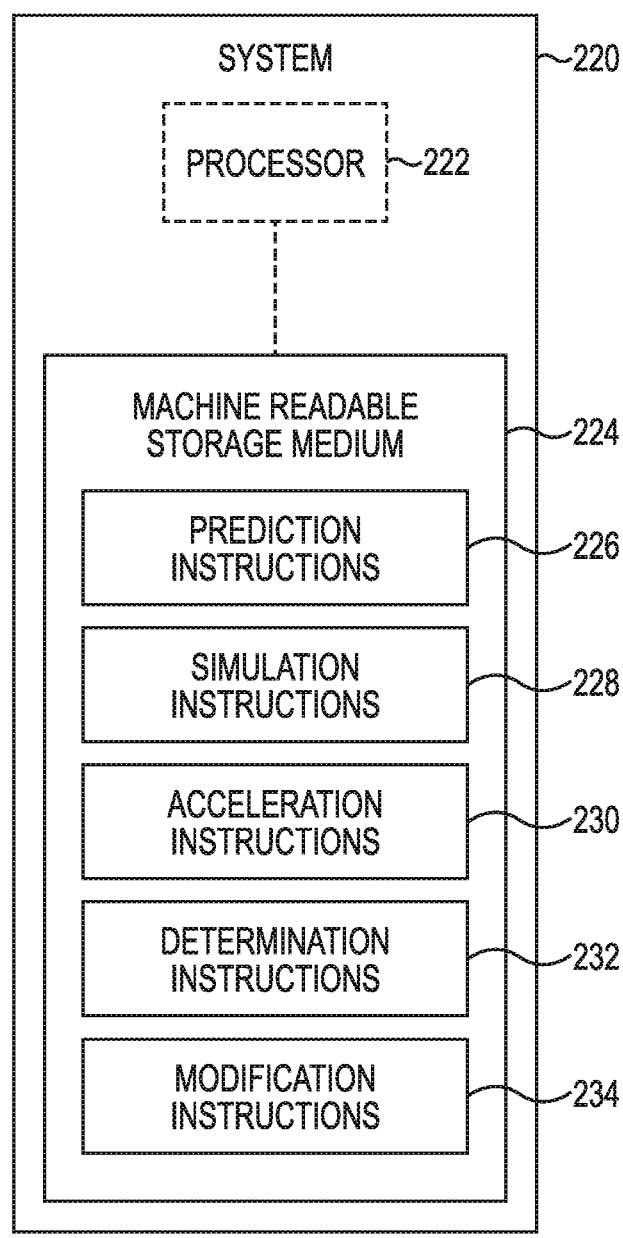
FIG. 2 is a block diagram of an example system for environment simulation, consistent with the present disclosure.

FIG. 2 is a block diagram of an example system 220 for environment simulation, consistent with the present disclosure. System 220 may include a computing device that is capable of communicating with a remote system. In the example of FIG. 2, system 220 includes a processor 222 and a machine-readable storage medium 224. Although the following descriptions refer to a single processor and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor 222 may be a CPU, microprocessor, and/or other hardware device suitable for retrieval and execution of instructions stored in machine-readable storage medium 224. In the particular example shown in FIG. 2, processor 222 may receive, determine, and send instructions 226, 228, 230, 232, 234 for environment simulation. As an alternative or in addition to retrieving and executing instructions, processor 222 may include an electronic circuit comprising a number of electronic components for performing the operations of the instructions in machine-readable storage medium 224. With respect to the executable instruction representations or boxes described and shown herein, it should be understood that part or all of the executable instructions and/or electronic circuits included within one box may be included in a different box shown in the figures or in a different box not shown.

Machine-readable storage medium 224 may be any electronic, magnetic, optical, or other physical storage device that stores executable instructions. Thus, machine-readable storage medium 224 may be, for example, RAM, an Electrically-Erasable Programmable Read-Only Memory (EEPROM), a storage drive, an optical disc, and the like. Machine-readable storage medium 224 may be disposed within system 220, as shown in FIG. 2. In this situation, the executable instructions may be "installed" on the system 220. Machine-readable storage medium 224 may be a portable, external or remote storage medium, for example, that allows system 220 to download the instructions from the portable/external/remote storage medium. In this situation, the executable instructions may be part of an "installation package". As described herein, machine-readable storage medium 224 may be encoded with executable instructions for monitoring network utilization.

Referring to FIG. 2, prediction instructions 226, when executed by a processor such as processor 222, may cause system 220 to predict a plurality of anomalies within a system using collected monitoring data from a real system environment. For instance, information about data behavior may be collected, and using this data, normal behavior may be learned. Using this information, signs and trends that undesired outcomes may occur based on comparisons to the previously determined normal behavior.

Simulation instructions 228, when executed by a processor such as processor 222, may cause system 220 to simulate, within an environment simulation, conditions in which the predicted plurality of anomalies occurs. In some examples, the system 220 includes instructions executable by the processor 222 to simulate the conditions based on trends detected in the real environment using the collected monitoring data. For instance, specific conditions where a problem or abnormal behavior is detected or predicted may be simulated. In such an example, an exact scenario may be simulated using trends predicted in the real environment. An exact scenario may be simulated because applications may be so complex that everything may not be tested.

For example, environment simulation may include deployment of devices, deployment of applications running on those devices, an associated network configuration, and integrations between the devices and/or with external back-end systems. Additionally or alternatively, other associated hardware, software, etc. that may be used to reproduce a subset of the environment simulation that is relevant to the detected anomaly may be used.

In some examples, environment simulations may include setting states of the devices, input and output data streams, simulation of physical conditions, and/or a specific flow or sequence of actions as detected as the time of the anomaly. The environment simulation can be done by recording and then replaying the real data from the production systems, by mirroring the real data to the testing environment, and/or by generating synthetic data that may reproduce the production system behavior and the detected anomaly.

Acceleration instructions 230, when executed by a processor such as processor 222, may cause system 220 to accelerate the conditions within the environment simulation. In some examples, the accelerations instructions 230, when executed by a processor such as processor 222, may cause system 220 to simulate the conditions at a rate faster than occurs in the real environment, simulate the conditions at a level more severe than occurs in the real environment, and simulate the conditions at a more frequent occurrence than in the real environment. In some examples, once environment simulation occurs, the anomaly, a trend, an abnormal trend, problem, abnormal behavior, etc. may be accelerated. This may allow for determinations and/or discoveries of anomalies, problems, abnormal behavior, trends, etc. before a determination may be made in the real world. This allows for fixes available before issues occur in the real world. The implementation of the acceleration may depend on the type of the anomaly. This may include changing input or output data streams, modifying behavior of the anomaly by injecting more faults, and/or modifying the behavior of the anomaly to mimic certain physical conditions (e.g., a quick increase or decrease in the temperature measurements as reported by a temperature sensors), among others. Determination instructions 232, when executed by a processor such as processor 222, may cause system 220 to determine a solution to at least one of the predicted plurality of anomalies using information collected during the accelerated conditions. In some examples, the determination may include a temporary solution determination to the at least one of the predicted plurality of anomalies and/or a permanent solution determination to the at least one of the predicted plurality of anomalies. In some examples, determination instructions 232 may be executed a plurality of times to execute a root cause analysis of an abnormal behavior that is detected while simulating a scenario in an accelerated way. Such an example may include the controller executing tools of debugging and monitoring to find a root cause of the abnormal behavior. Additionally or alternatively, determination instructions 232 may be executed a plurality of times to determine a solution. For instance, a root cause analysis and/or a determination may be a process with a number of steps within the process.

Modification instructions 234, when executed by a processor such as processor 222, may cause system 220 to modify a device within the system to be adaptive to the at least one of the predicted plurality of anomalies based on the solution. For example, modification instructions 234, when executed by the processor may modify executable instructions associated with the device (e.g., code and/or code configuration) to fix abnormal behaviors. For instance, a device, application, environment, etc. (e.g., executable instructions associated with it) may be fixed using a fix determined during simulation. For instance, changes may be made to executable instructions that affect how the device, application, environment, etc. performs in the real world. The executable instructions may include fixes to allow the device, application, environment, etc. to adapt to anomalies experienced in the environment simulation. In some examples, all devices, applications, etc. in an environment may be fixed or only a specific device(s), application(s), etc. may be fixed.

Figure 3:
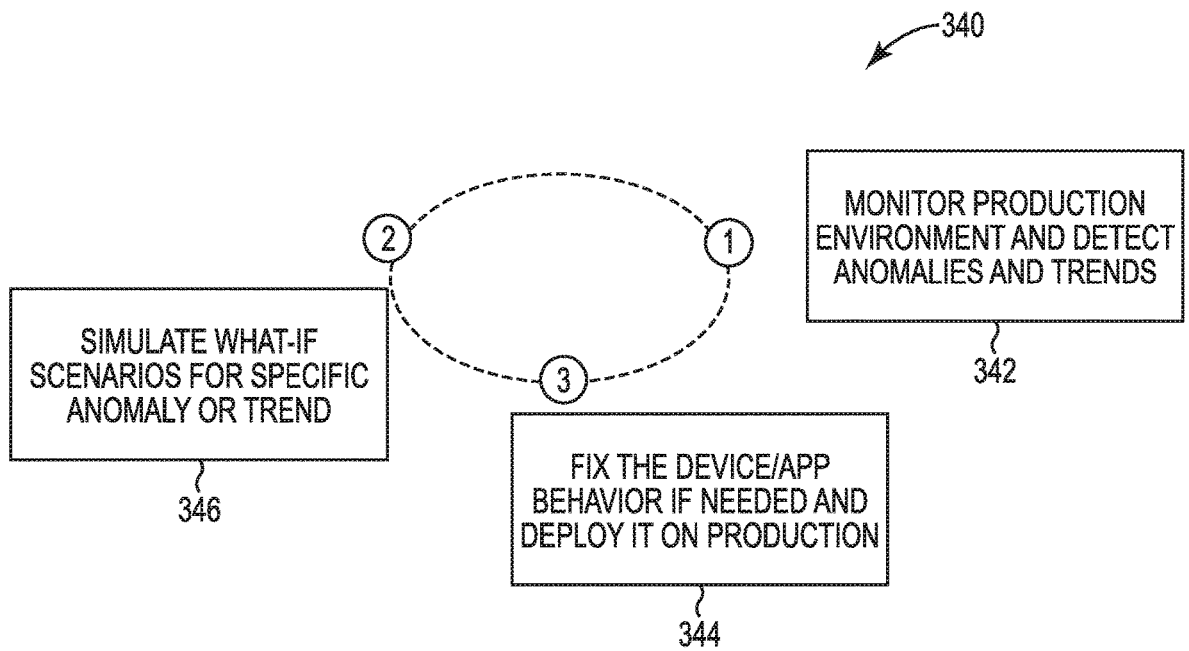
FIG. 3 illustrates an example method for environment simulation consistent with the present disclosure.

FIG. 3 illustrates an example method 340 for environment simulation consistent with the present disclosure. At 342, a production environment may be monitored and anomalies and trends may be detected. For instance, monitoring data may be collected from a real environment, and predictions may be created based on the collected data. An environment simulation may be built or run to mimic parts of the real environment that are relevant to the detected anomaly and/or trend. For instance, input from sources and times relevant to the detected anomaly and/or trend may be used to run the environment simulation. The environment simulation may be built or run to reproduce behavior of a desired device, application, etc. as it would perform taking into account the detected anomaly and/or trend.

At 346, "what-if" scenarios may be simulated within the environment simulation for the detected anomaly and/or trend. The simulation may include accelerating the scenarios. For instance, acceleration may include making the scenarios happen faster or more frequently. This may provide a way for acceleration of events that may happen based on the predictions (e.g., system failure, faults, etc.). As discussed with respect to FIG. 2, the implementation of the acceleration may depend on the type of the anomaly and/or trend. This may include changing input or output data streams, modifying behavior of the anomaly by injecting more faults, and/or modifying the behavior of the anomaly to mimic certain physical conditions, among others. The simulation may be performed by streaming the real data from the production environment to the environment simulation, among other approaches. In some examples, problems may be determined for the tested scenarios before they happen in the real environment. For instance, because the environment simulation occurs at a pace faster than in the real environment, problems may be detected in the environment simulation first.

At 344, a device, application, system, etc. behavior may be fixed, if necessary, and the fix may be deployed. For instance, real-world devices may be modified proactively to be adaptive to the tested scenarios. Additionally or alternatively, the modification may be performed when predicted trends and/or anomalies begin to materialize in the real environment. For instance, associated executable instructions may be changed, updated, fixed, etc. to make the devices adapt to the discovered trends and/or anomalies.

Figure 4:
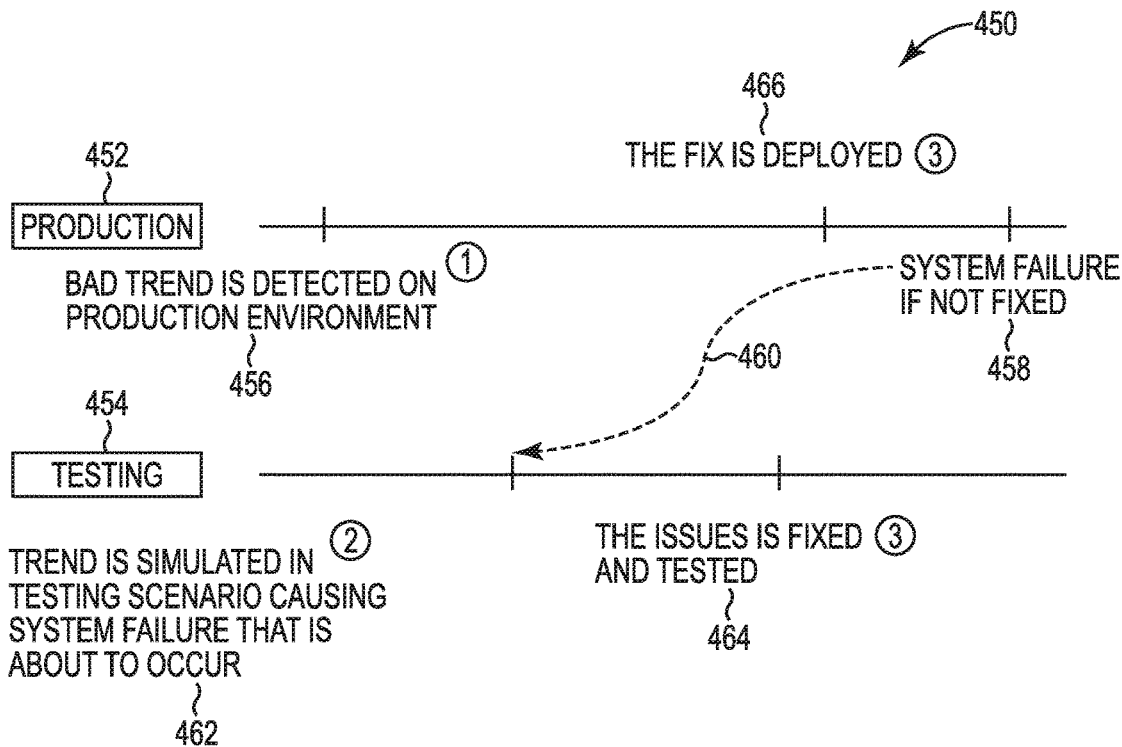
FIG. 4 illustrates an example method for environment simulation consistent with the present disclosure.

FIG. 4 further illustrates an example method 450 for environment simulation consistent with the present disclosure. The elements illustrated in FIG. 4 may correspond to elements in FIG. 3. For instance elements in FIG. 3 marked with a "1", "2", or "3" may correspond to elements in FIG. 4 marked with a "1", "2", or "3", respectively. Method 450 illustrates example phases of the present disclosure. For instance, examples may occur during production 452 and during testing 454.

At 456, a trend and/or anomaly is detected on a production environment. The production environment may be a real-world production environment. At 462, the trend and/or anomaly is simulated in a testing scenario to cause a system, application, etc. failure in the environment simulation. The simulation may be accelerated, allowing for discovery of anomalies/trends at a faster rate than in a real-world environment. This may allow for determination of a fix within an environment simulation before the trend/anomaly occurs in the real environment.

At 464, the trend/anomaly issue or issues are fixed within the environment simulation, and at 466, the fix is deployed to fix the trend and/or anomaly in the real production environment that was detected or predicted during simulation. At 458, if the fix does not work, simulation is repeated at 462.

A particular example of the present disclosure may include a deployment of a smart city. Part of the smart city deployment may be a smart lighting system that includes a camera collecting data about people using public transportation. This data may be analyzed to manage public transportation routes. In a particular example, developers of the system may have ignored situations such as construction workers closing a lane at 4 AM, a fact that may be discovered by monitoring cameras. In such an example, closing a lane may cause degradation of traffic speed after 7 AM and consequentially affect public transportation waiting times. For instance, the monitoring system may discover a trend of longer waiting times at certain hours or as a result of road work.

In such an example, predictive testing in accordance with the present disclosure may be used to simulate the smart lighting system in the environment simulation using physical or virtual devices (or a combination of both physical and virtual devices). "What-if" scenarios may be run, including a scenario of increased people traffic at a specific time to test an effectiveness of a transportation routing system for a specific location that detected the undesired trend (e.g., longer waiting times). Another example may include adjusting associated executable instructions such that they isolate the fact that a lane is closed, and that as a result traffic will be slower. This may be applied to the "what-if" scenarios, for instance. If a problem is discovered in the environment simulation, the transportation routing may be fixed and deployed on production devices before the trend may become more severe.

In the example above, the anomaly may be detected at the specific junction of the smart city deployment. The environment simulation may be built to include similar configuration of the smart lighting system devices deployed at this junction, the executable instructions associated with those devices, connectivity, integrations between the devices, and/or with external systems such as backend systems that may run in cloud.

Additionally or alternatively, environment simulation may include setting states of the devices and input and output data streams and simulating of physical conditions such as closing one of the lanes. Environment simulation may additionally or alternatively include setting a specific flow or sequence of actions as detected as the time of the anomaly (e.g., slower traffic and increased number of people waiting for the transportation to arrive). Environment simulation in such an example can include recording and then replaying the real data from the production systems, by mirroring the real data to the testing environment, and/or by generating synthetic data that may reproduce the production system behavior and the detected anomaly.

Figure 5:
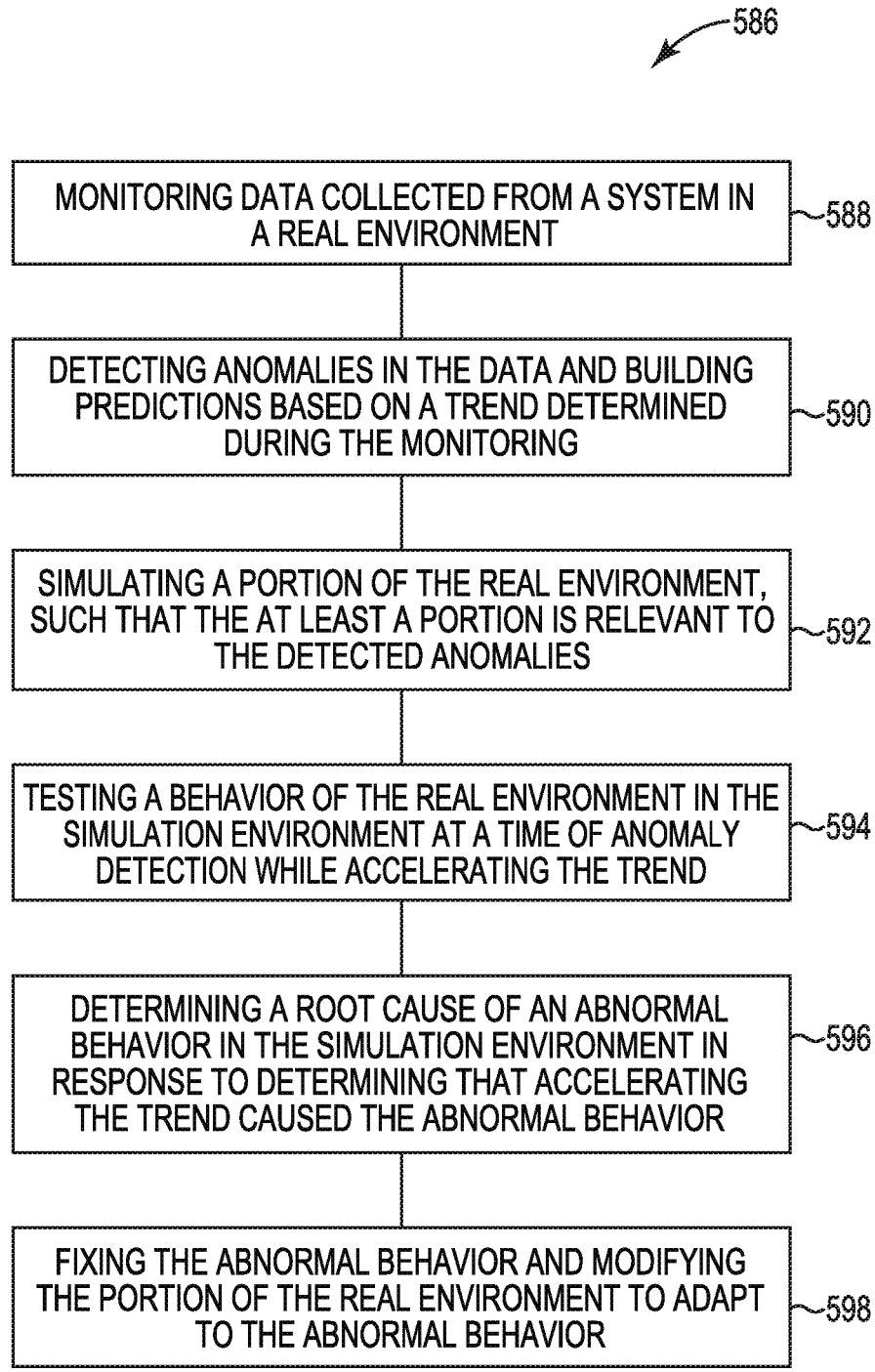
FIG. 5 illustrates an example method for environment simulation consistent with the present disclosure.

Once the environment is simulated, the anomaly/trend may be accelerated depending on the type of the detected anomaly/trend. In the smart city example, the increased people traffic may be simulated by substituting the camera inputs with new images containing more crowded environment or by modifying the metric of the detected number of people after the processing of the camera inputs is completed, for instance. FIG. 5 illustrates an example method 586 for environment simulation. At 588, method 586 may include monitoring data collected from a system in a real environment. The data may be used to learn normal behavior of the system in a real environment. The knowledge of this normal behavior may be used to predict trends, anomalies, etc.

At 590, method 586 may include detecting anomalies in the data and building predictions based on a trend determined during the monitoring. For instance, comparisons between a normal behavior and a current behavior may be made, predictions may be made based on the comparisons, and anomalies may be detected based on the predictions and comparisons.

Method 586, at 592 may include simulating a portion of the real environment, such that the at least a portion is relevant to the detected anomalies. At 594, method 586 may include testing a behavior of the real environment in the environment simulation at a time of anomaly detection while accelerating the trend. This may include running a testing scenario that simulates a behavior of the real environment at the time of a detected anomaly while accelerating the trend, for instance. Environment simulation may include deployment of certain applications, devices, services, connectivity, etc.

Performing accelerated simulations, in some examples, may include simulating a specific scenario and accelerating a determined behavior/trend. For instance, this may include certain application or device states, specific physical conditions, specific flows, specific sequence of actions, etc. In some examples, performing accelerated simulations and/or testing the behavior may include streaming data from the real environment to the environment simulation. The accelerated simulation may allow for issues to be detected in the environment simulation before they would be detected in the real-world environment, allowing for fixes and adaptations to be determined before the issue occurs in the real-world environment.

At 596, method 586 may include determining a root cause of an abnormal behavior in the environment simulation in response to determining that accelerating the trend caused the abnormal behavior. Fixes can be made based these detected abnormal behaviors, as noted above. Method 586, at 598, may include fixing the abnormal behavior and modifying the portion of the real environment to adapt to the abnormal behavior. For instance, the environment (or portion of) may be modified before the detected anomalies and the detected abnormal behaviors occur. In some examples, the environment (or portion of) may be modified in response to the detected anomalies and/or detected abnormal behaviors occurring in the real environment, in some instances. For instance, the fix may be available, and when the abnormal behavior occurs in the real environment, the fix may be deployed.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

What is claimed is:

1. A computing system for environment simulation, the computing system comprising:
   a processor; and a computer-readable storage medium storing computer-readable instructions which, when executed by the processor, cause the processor to execute a method, the method comprising:

detecting an anomaly in a real environment;

in response to detecting the anomaly, building an environment simulation to mimic portions of the real environment relevant to the detected anomaly;

simulating, within the environment simulation, a scenario associated with the detected anomaly at a rate higher than a rate at which the scenario occurs in the real environment;

detecting, within the environment simulation, an abnormal behavior associated with the scenario;

selecting one or more executable instructions associated with a device within the real environment to modify based on results of simulating the scenario associated with the detected anomaly at the rate higher than the rate at which the scenario occurs in the real environment;

modifying, within the environment simulation, the selected one or more executable instructions in a simulation of the device;

after modifying the selected one or more executable instructions in the simulation of the device, determining that the anomaly is resolved in the environment simulation; and in response to determining that the anomaly is resolved in the environment simulation, modifying, within the real environment, the selected one or more executable instructions in the device within the real environment.

2. The computing system of claim 1, wherein detecting the anomaly comprises creating predictions using collected monitoring data, wherein the anomaly in the real environment is detected based on the predictions.

3. The computing system of claim 1, wherein the selected one or more executable instructions associated with the device within the real environment are modified in response to a predicted anomaly occurring in the real environment.

4. The computing system of claim 1, wherein the scenario associated with the detected anomaly is simulated at a severity level higher than a severity level at which the scenario occurs in the real environment.

5. The computing system of claim 1, wherein the scenario associated with the detected anomaly is simulated at a more frequent occurrence than the scenario occurs in the real environment.

6. The computing system of claim 1, wherein modifying the selected one or more executable instructions associated with the device within the real environment comprises changing code associated with configuration settings of the device.

7. The computing system of claim 1, wherein simulating the scenario comprises reproducing behavior of the device.

8. A non-transitory machine-readable medium storing computer-readable program code configured, when executed by a processor, to execute a method, the method comprising:

detecting an anomaly in a real environment;

in response to detecting the anomaly, building an environment simulation to mimic portions of the real environment relevant to the detected anomaly;

simulating, within the environment simulation, a scenario associated with the detected anomaly at a rate higher than a rate at which the scenario occurs in the real environment;

detecting, within the environment simulation, an abnormal behavior associated with the scenario;

selecting one or more executable instructions associated with a device within the real environment to modify based on results of simulating the scenario associated with the detected anomaly at the rate higher than the rate at which the scenario occurs in the real environment;

modifying, within the environment simulation, the selected one or more executable instructions in a simulation of the device;

after modifying the selected one or more executable instructions in the simulation of the device, determining that the anomaly is resolved in the environment simulation; and in response to determining that the anomaly is resolved in the environment simulation, modifying, within the real environment, the selected one or more executable instructions in the device within the real environment.

9. The medium of claim 8, wherein detecting the anomaly comprises creating predictions using collected monitoring data, wherein the anomaly in the real environment is detected based on the predictions.

10. The medium of claim 8, wherein the selected one or more executable instructions associated with the device within the real environment are modified in response to a predicted anomaly occurring in the real environment.

11. The medium of claim 8, wherein the scenario associated with the detected anomaly is simulated at a severity level higher than a severity level at which the scenario occurs in the real environment.

12. The medium of claim 8, wherein the scenario associated with the detected anomaly is simulated at a more frequent occurrence than the scenario occurs in the real environment.

13. The medium of claim 8, wherein modifying the selected one or more executable instructions associated with the device within the real environment comprises changing code associated with configuration settings of the device.

14. The medium of claim 8, wherein simulating the scenario comprises reproducing behavior of the device.

15. A method for environment simulation, the method comprising:

detecting, with a processor of a computing system, an anomaly in a real environment;

in response to detecting the anomaly, building, with the processor, an environment simulation to mimic portions of the real environment relevant to the detected anomaly;

simulating, with the processor, within the environment simulation, a scenario associated with the detected anomaly at a rate higher than a rate at which the scenario occurs in the real environment;

detecting, with the processor, within the environment simulation, an abnormal behavior associated with the scenario;

selecting, with the processor, one or more executable instructions associated with a device within the real environment to modify based on results of simulating the scenario associated with the detected anomaly at the rate higher than the rate at which the scenario occurs in the real environment;

modifying, with the processor, within the environment simulation, the selected one or more executable instructions in a simulation of the device;

after modifying the selected one or more executable instructions in the simulation of the device, determining, with the processor, that the anomaly is resolved within the environment simulation; and in response to determining that the anomaly is resolved in the environment simulation, modifying, within the real environment, with the processor, the selected one or more executable instructions in the device within the real environment.

16. The method of claim 15, wherein detecting the anomaly comprises creating predictions using collected monitoring data, wherein the anomaly in the real environment is detected based on the predictions.

17. The method of claim 15, wherein the selected one or more executable instructions associated with the device within the real environment are modified in response to a predicted anomaly occurring in the real environment.

18. The method of claim 15, wherein the scenario associated with the detected anomaly is simulated at a severity level higher than a severity level at which the scenario occurs in the real environment.

19. The method of claim 15, wherein the scenario associated with the detected anomaly is simulated at a more frequent occurrence than the scenario occurs in the real environment.

20. The method of claim 15, wherein modifying the selected one or more executable instructions associated with the device within the real environment comprises changing code associated with configuration settings of the device.

* * * * *